United States Patent Office 2,949,451
Patented Aug. 16, 1960

2,949,451

PREPARATION OF THYMIDINE AND DEOXY-FLUOROURIDINE, AND INTERMEDIATES THEREFOR

Max Hoffer, Nutley, N.J., assignor to Hoffmann-La Roche Inc., Nutley, N.J., a corporation of New Jersey No Drawing. Filed Apr. 21, 1959, Ser. No. 807,769

9 Claims. (Cl. 260—211.5)

This invention relates to novel chemical processes and to novel intermediates therefor. More particularly, it relates to the preparation of 2'-deoxy-5-fluorouridine and thymidine, the β-anomers of which are known compounds. The invention relates further to new chemical compounds useful as intermediates in the preparation of 2'-deoxy-5-fluorouridine and thymidine by the processes herein disclosed.

A comprehensive survey of various aspects of the invention may be had by reference to the following flow sheet, wherein the symbol Z represents a member selected from the group consisting of fluorine and methyl, and the symbol R represents an aryl radical. Preferably, R represents a radical containing not more than ten carbon atoms selected from the group consisting of monocyclic aryl hydrocarbon radicals and negatively substituted monocyclic aryl hydrocarbon radicals. Especially preferred are those embodiments of the invention wherein R represents an aryl radical containing not more than ten carbon atoms selected from the group consisting of phenyl, lower alkyl-phenyl (e.g. p-tolyl, o-tolyl, p-ethyl-phenyl, xylyl, etc.), lower alkoxy-phenyl (e.g. anisyl, o-methoxy-phenyl, etc.), and halophenyl (e.g. p-chloro-phenyl, o-chlorophenyl, p-bromophenyl, etc.) and nitro-phenyl (e.g. p-nitrophenyl).

FLOW SHEET

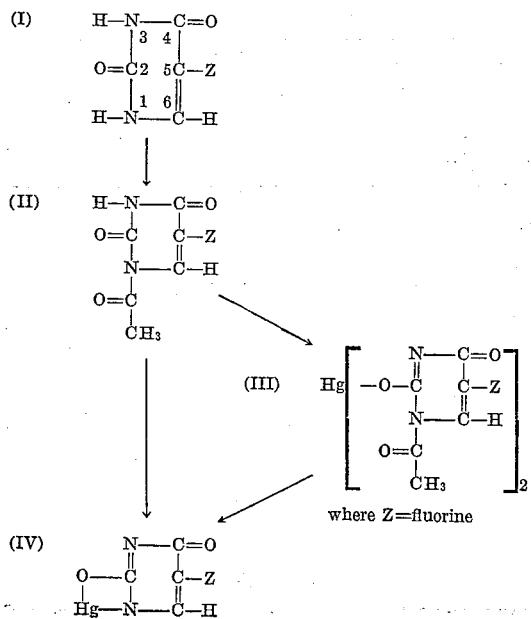

where Z=fluorine

On reference to the flow sheet, it will be seen that one important embodiment of the invention relates to a process of making 2'-deoxy-5-fluorouridine which comprises reacting 3,5-diaroyl-2-deoxy-D-ribofuranosyl halide with mono(5-fluorouracilyl)-mercury, thereby forming 1-(3',5'-diaroyl-2'-deoxy-D-ribofuranosyl)-5-fluorouracil, and hydrolyzing the latter.

Another important embodiment of the invention relates to a process of making thymidine which comprises reacting 3,5-diaroyl-2-deoxy-D-ribofuranosyl halide with monothyminylmercury, thereby forming 1-(3',5'-diaroyl-2'-deoxy-D-ribofuranosyl)-thymine, and hydrolyzing the latter.

The compounds of Formula IV above are also novel, and these too constitute important embodiments of the invention. Species of Compound IV may be prepared via several novel processes and intermediates, and these constitute subsidiary aspects of the embodiments of the invention here under discussion. Thus, in one aspect, the invention provides a process of making mono(5-fluoro-uracilyl)mercury which comprises heating an alcoholic solution containing, dissolved therein, bis(1-acetyl-5-fluorouracilyl)mercury, a mercuric salt of an organic carboxylic acid and a lower alkanol. The invention also includes the novel compound bis(1-acetyl-5-fluorouracilyl)mercury. In another aspect, the invention provides a process of making mono(5-fluorouracilyl)mercury which comprises heating a solution containing, dissolved therein, 1-acetyl-5-fluorouracil and a mercuric salt of an organic carboxylic acid. The invention also includes the novel compound 1-acetyl-5-fluorouracil. In still another aspect, the invention provides a process of making mono(5-fluorouracilyl)mercury which comprises heating a solution containing, dissolved therein, 5-fluorouracil and a mercuric salt of an organic carboxylic acid. In still another aspect, the invention provides a process of making monothyminylmercury which comprises heating a solution containing, dissolved therein, 1-acetylthymine and a mercuric salt of an organic carboxylic acid. The invention also includes the novel compound monothyminylmercury.

Those skilled in the art will appreciate that, whereas the novel mercury compounds referred to above are represented in the flow sheet in a particular monomeric form, they can also exist in polymeric and tautomeric forms; these are, of course, included in the invention. Thus, whereas Formula IV in the flow sheet represents a compound containing only a single mercury atom, i.e. in this instance a monomeric compound, the invention also includes dimers and higher polymers thereof, containing two or more mercury atoms, respectively. Also, whereas the carbonyl group in Formula IV is shown in the oxo or unenolized condition, it will be appreciated that the invention also includes tautomeric forms wherein carbonyl groups are present, in whole or in part, in enolized condition. Moreover, whereas the mercuric salts of organic carboxylic acids referred to above include such compounds as mercuric formate, mercuric acetate, mercuric benzoate and the like, it is preferred to employ mercuric acetate.

With reference again to the flow sheet, and considering in greater detail the various steps or stages of the processes of the invention disclosed in the flow sheet:

The stage (I→II) comprises the acetylation of 5-fluorouracil or of thymine. This can be accomplished by direct reaction of the 5-substituted pyrimidine with an acetylating agent, in an inert solvent medium if desired. A convenient method comprises refluxing 5-fluorouracil or thymine with acetic anhydride in the presence of a small amount of a tertiary organic base, e.g. pyridine.

The stage (II→III) comprises conversion of 1-acetyl-5-fluorouracil to bis(1-acetyl-5-fluorouracilyl)mercury. This can be accomplished by liquid phase reaction of dissolved 1-acetyl-5-fluorouracil with a dissolved mercuric salt of an organic carboxylic acid (preferably mercuric acetate), in the proportion of substantially one mol of acetylfluorouracil to 0.5 mol of mercuric salt. A convenient method comprises dissolving 1-acetyl-5-fluorouracil in a lower alkanol by heating, and mixing the warm solution with a half-molar proportion of mercuric acetate.

The stage (III→IV) comprises refluxing bis(1-acetyl-5-fluorouracilyl)mercury in a lower alkanol with a mercuric salt of an organic carboxylic acid (preferably mercuric acetate), in proportions of one mol of bis compound to at least one mol of mercuric salt, preferably in a proportion of substantially one mol to one mol. A reaction takes place in which the acetyl group is removed by alcoholysis and simultaneously replaced by mercury.

As indicated in the flow sheet, alternative procedures are also available for making mono(5-fluorouracilyl)mercury.

Thus, one form of the process (II→IV) comprises direct formation of mono(5-fluorouracilyl)mercury from 1-acetyl-5-fluorouracil. This can be accomplished by reacting the latter with a solution of mercuric salt of an organic carboxylic acid (preferably mercuric acetate) in a lower alkanol; in a proportion of one mol of acetylfluorouracil to more than 0.5 mol of mercuric salt, preferably in a proportion of substantially one mol to one mol.

Another form of the process (II→IV) comprises formation of monothyminylmercury from 1-acetylthymine. This can be accomplished by reacting 1-acetylthymine with a solution of a mercuric salt of an organic carboxylic acid (preferably mercuric acetate) in a lower alkanol, in the same manner described above for mono-(5-fluorouracilyl)mercury. It is preferred to use the pyrimidine reactant and the mercurating reagent in substantially equimolar proportions.

A direct procedure for preparing mono(5-fluorouracilyl)mercury from 5-fluorouracil (I→IV) comprises reacting dissolved 5-fluorouracil with a dissolved mercuric salt of an organic carboxylic acid (preferably mercuric acetate). Thus, 5-fluorouracil can be reacted with mercuric acetate in solution in hot water or dioxan. A preferred method comprises mixing a hot methanolic solution of mercuric acetate with a hot aqueous solution of 5-fluorouracil.

The novel condensation step of the invention (IV+V→VI)

is effected by heating a mixture of the two reactants in an inert organic liquid. A convenient mode of execution comprises adding 3,5 - diaroyl-2-deoxy-D-ribofuranosyl chloride to a suspension of mono(5-fluorouracilyl)mercury or monothyminylmercury in toluene and refluxing the material, then adding potassium iodide to the mixture in order to remove mercuric chloride from the toluene layer, and precipitating the condensation product by addition of heptane to the toluene layer, or by concentrating the toluene layer. The crystalline reaction product obtained is usually a mixture of anomeric forms. The mixture can be subjected to the next step of saponification without separation of the anomeric forms, if desired. Alternatively, the two anomers can be separated by fractional crystallization, and the separated isomers can be individually saponified.

The final step shown in the flow sheet, hydrolysis of (VI) to (VII), can be accomplished by saponification methods known per se. For example, the aroyl groups can be removed by treating compound (VI) with anhydrous ammonia in ethanol. A preferred embodiment of this aspect of the invention as it relates to the preparation of 2'-deoxy-5-fluorouridine comprises treating 1-(3',5'-diaroyl - 2' - deoxy-D-ribofuranosyl)-5-fluorouracil with methanolic barium methylate.

This application is a continuation-in-part of my prior application Serial No. 787,118, filed January 16, 1959, now abandoned.

The invention is further disclosed in the following examples, which are illustrative but not limitative thereof. Temperatures are stated in degrees centigrade, uncorrected. The yields stated are also merely illustrative.

*Exampl 1.—1-acetyl-5-fluorouracil*

[II, Z=fluorine.]

13.0 g. of 5-fluorouracil was refluxed, while stirring, with 50 ml. of acetic anhydride and 0.5 ml. of pyridine unitil all had dissolved (10–15 minutes). Refluxing was continued for 15 minutes longer. The clear, slightly pink solution was evaporated in a vacuum and the crystalline residue was dissolved in 100 ml. of hot toluene. The solution was separated from a little insoluble, discolored, sandy material by filtering while hot, with suction, and the filtrate was allowed to cool. The crystals which separated were filtered with suction and dried at 70°. The yield of 1-acetyl-5-fluorouracil amounted to 14.9 g., corresponding to 86.5% of theory; M.P. 128–129°. Repeated crystallization from toluene did not change the melting point. The compound was very rapidly saponified by alkali.

*Analysis.*—$C_6H_5N_2O_3F$, calc'd: C, 41.7; H, 2.9; N, 16.3. Found: C, 41.95; H, 3.15; N, 16.07.

*Example 2.—Bis(1-acetyl-5-fluorouracilyl)mercury*

[III, Z=fluorine.]

5.1 g. (0.03 mol) of 1-acetyl-5-fluorouracil was dissolved in 50 ml. of ethanol at 75–78° and 5 g. of mercuric acetate was added while stirring. The organic mercury compound produced by the reaction precipitated rapidly in the form of voluminous needle aggregates. After allowing the mixture to cool and stand overnight, the product was filtered by suction, washed with alcohol and dried at 70°. The yield, 7.9 g. of bis(1-acetyl-5-fluorouracilyl) mercury, corresponded to 97.5% of theory. The amount of acetic acid found in the filtrate by titration was 1.80 g., corresponding to 100% of theory.

Bis(1-acetyl-5-fluorouracilyl)mercury was a crystalline white fluffy powder melting with decomposition at 207°. It was insoluble in conventional solvents, rather stable toward acetic acid, but not toward hydrochloric acid or alkali.

Analysis.—$(C_6H_4N_2O_3F)_2Hg$, calc'd: N, 10.3. Found: N, 10.07, 10.24.

Example 3.—Mono(5-fluorouracilyl)mercury

[IV, Z=fluorine.]

(a) FROM BIS(1-ACETYL-5-FLUOROURACILYL) MERCURY 5.4 g. (0.01 mol) of bis(1-acetyl-5-fluorouracilyl)mercury was added to a boiling solution of 3.18 g. (0.01 mol) of mercuric acetate in 60 ml. of methanol. The mixture was refluxed for 20 minutes while stirring, allowed to cool, and the solid was filtered by suction. The yield (6.6 g.) of mono(5-fluorouracilyl)mercury corresponded to substantially 100%. The product did not melt below 300°. In the filtrate, about 0.02 mol of acetic acid and 0.02 mol of methyl acetate were determined by alkalimetric titration.

(b) FROM 1-ACETYL-5-FLUOROURACIL 9.46 g. (0.03 mol) of mercuric acetate was dissolved in 180 ml. of boiling methanol. After allowing the solution to cool to 55–60°, 5.1 g. (0.03 mol) of 1-acetyl-5-fluorouracil was added in a single portion while stirring. After about one minute, mono(5-fluorouracilyl)mercury precipitated suddenly. The mixture was allowed to stand overnight, and then the product was filtered by suction, washed with methanol and ether, and dried first at room temperature, then at 70°. The yield (9.9 g.) was practically quantitative.

(c) FROM 5-FLUOROURACIL 31.9 g. (0.1 mol) of mercuric acetate was dissolved in 600 ml. of methanol while stirring and refluxing. A hot solution of 13 g. (0.1 mol) of 5-fluorouracil in 250 ml. of water was added, causing an immediate precipitation of mono(5-fluorouracilyl)mercury. The mixture was allowed to cool to room temperature while stirring, and then was stirred for 12 hours longer. The fine precipitate was filtered by suction. The filter cake, without being dried, was suspended in 500 ml. of toluene and the mixture was stirred and heated until all methanol and water had distilled off (drying by azeotropic distillation). Toluene that distilled off with methanol and water was replaced from time to time by fresh toluene. After allowing the mixture to cool, the solid was filtered by suction and dried at 70° until toluene-free. The yield (33 g.) was quantitative.

Analysis.—$C_4HO_2N_2HgF$, calc'd: N, 8.54. Found: N, 8.02.

Example 4.—3',5'-di(p-toluoyl)-2'-deoxy-5-fluorouridine

[VI, Z=fluorine, R=p-tolyl.]

6.6 g. of mono(5-fluorouracilyl)mercury, finely powdered, was suspended in 300 ml. of toluene in a three-neck, round-bottom flask equipped with stirrer, moisture-trap and reflux condenser. The mixture was heated while stirring and 100 ml. of toluene was distilled off (by discharging the moisture-trap when it had filled). The mixture then was refluxed for 20 minutes longer without discharging the moisture-trap. 15 g. of 3,5-di(p-toluoyl)-2-deoxy-D-ribofuranosyl chloride (V, R=p-tolyl) was added. All of the material dissolved immediately to a substantially clear solution. Heating was continued for 20 minutes and 50 ml. of toluene, accumulated in the moisture-trap, was taken off. The solution was allowed to cool, and a solution of 20 g. of potassium iodide in 80 ml. of water was added to remove mercuric chloride from the toluene layer. The toluene layer was separated, and to it was added 200 ml. of heptane, while stirring. The white crystalline deposit that rapidly developed was filtered by suction, washed on the filter with heptane and water, and dried at 70°. The yield of 6.5 to 6.8 g. corresponded to 68–70% of theory. The melting point of this mixture of isomeric forms of 3',5'-di(p-toluoyl)-2'-deoxy-5-fluorouridine was 195–200°.

The reactant 3,5-di(p-toluoyl)-2-deoxy-D-ribofuranosyl chloride, referred to above, can be made by the following procedure:

13.6 g. of 2-deoxy-D-ribose was dissolved in 245 ml. of methanol and 27 ml. of a 1% solution of anhydrous hydrogen chloride in methanol was added. The mixture was allowed to stand for 20 minutes at 27° and then was stirred with 5 g. of silver carbonate until it no longer reacted acidic. The silver salts were removed by filtration with suction and were washed with methanol. The combined filtrate and washings were evaporated in a vacuum as far as possible, 20 ml. pyridine was added and the solution was again evaporated in a vacuum in order to remove the last traces of methanol.

The syrupy residue of 1-methyl-2-deoxy-D-ribofuranoside was then dissolved in 80 ml. of dry pyridine, the solution was cooled to approximately 0°, and 34 g. of p-toluoyl chloride was added in portions while maintaining the temperature belw 20°. After the addition of the chloride, the temperature was allowed to rise to 40–45° and kept there for two hours. The mixture was diluted with 500 ml. of water, the oily precipitate was shaken out with 200 ml. of ether, the ether layer was washed successively with water, $KHSO_4$ solution, water, $KHCO_3$ solution, and water again, and was then dried over anhydrous sodium sulfate. The ether was removed by evaporation in a vacuum and the remaining syrup of 3,5-di(p-toluoyl)-1-methyl-2-deoxy-D-ribofuranoside was dissolved in 20 ml. of acetic acid while warming. The solution was cooled to below 10°, and 80 ml. of a saturated solution of anhydrous hydrogen chloride in acetic acid was added at 0–10°. Anhydrous hydrogen chloride was conducted into the solution for a few minutes, whereupon the product crystallized rapidly, filling the whole vessel. After 10 minutes, the crystals were filtered by suction. The filter cake was slurried with 100 ml. of ice-cold absolute ether, the slurry was filtered with suction, and the filter cake was rapidly transferred into a vacuum desiccator and dried in a vacuum over soda lime at room temperature. The yield of 3,5-di(p-toluoyl)-2-deoxy-D-ribofuranosyl chloride amounted to 27.5 g.

Example 5.—β-3',5'-di(p-toluoyl)-2'-deoxy-5-fluorouridine

[VI, Z=fluorine, R=p-tolyl.]

20 g. of the mixture of isomeric forms of 3',5'-di(p-toluoyl)-2'-deoxy-5-fluorouridine, i.e. the combined yield of three batches made according to Example 4, were slurried with 60 ml. of pyridine and the mixture was stirred till all lumps had dispersed. After 30 minutes the crystalline mush was filtered by suction. The filter cake was pressed free of mother liquor and was washed with 10 ml. of pyridine on the filter. The pyridine was finally washed out with ether and the material was dried, first at room temperature, then at 70°, to constant weight. Yield: 9.6 g., M.P. 220–224°. After one recrystallization from 100 ml. of acetic acid, the yield amounted to 8–8.5 g. and the material showed a melting point of 229°. The rotation $\alpha_D^{25}$ was $-17°$ (2% in pyridine). This anomeric form of 3',5'-di(p-toluoyl)-2'-deoxy-5-fluorouridine is herein designated the β-form.

Example 6.—β-2'-deoxy-5-fluorouridine

[VII, Z=fluorine.]

20 g. of β-3',5'-di(p-toluoyl)-2'-deoxy-5-fluorouridine was suspended in 300 ml. of methanol and a small amount of alcoholic phenolphthalein solution (0.5–1 ml., 1%) was added. The suspension was cooled in ice water, and a 0.43 N methanolic barium methylate solution was added to definite alkalinity (40 ml.). The mixture was kept at 5–10°, with occasional shaking, till free of color. The above 0.43 N barium methylate solution was added in 10 ml. portions while cooling in ice water until, after six hours, the alkalinity persisted and the suspended material had gone into solution. Altogether, 80 ml. of 0.43 N barium methylate solution had to be added. The reaction mixture was allowed to stand in the refrigerator overnight (15 hours). Then 1 N aqueous sulfuric acid solution was added in an amount exactly equivalent to the barium methylate used. The colloidal precipitate of barium sulfate could not be filtered. The mixture was, therefore, evaporated in vacuo to a syrup, 200 ml. of acetone was added, the barium sulfate was filtered by suction through Celite and the filter residue was washed with 100 ml. of hot acetone. The combined filtrate and washings were evaporated in a vacuum, the residue was seeded and was washed with ether to remove methyl toluate. The ether-insoluble material crystallized completely. It was collected by filtration and washed with ether. The yield, 9.6 g. of β-2'-deoxy-5-fluorouridine, melting at 143°, corresponded to 94% of theorry. Recrystallization from butyl acetate gave 9.2 g. (90%) of material melting at 145°.

*Example 7.—α-3',5'-di(p-toluoyl)-2'-deoxy-5-fluorouridine*

[VI, Z=fluorine, R=p-tolyl.]

The first (pyridine) filtrate from Example 5 was diluted with 70 ml. of water and was allowed to stand. After one to two hours, more water was added (70 ml.), and the crystals were filtered by suction. They were washed on the filter with water, a little alcohol and ether. Yield of dry material, 8.6 g., M.P. 205–210°. This material was dissolved in 258 ml. of boiling acetone and the solution was allowed to crystallize for 48 hours in a refrigerator. The crystals were filtered by suction (5.8 g. of α-anomer, M.P. 212–213°), and the mother liquor was evaporated to dryness. The crystalline residue from the mother liquor was washed with ether and collected by filtration (2.6 g. of mixed α- and β-anomers, M.P. 195–200°). This mixture was again treated for separation of the isomers, by slurrying the mixture with 7.8 ml. of pyridine for 30 minutes, whereupon another crop of β-anomer (0.8–1 g.) was obtained.

The α-anomer, melting at 212–213°, was recrystallized from five times its weight of glacial acetic acid. The purified α-3',5'-di(p-toluoyl)-2'-deoxy-5-fluorouridine was obtained in white, elongated, small prisms, melting at 215°. The melting point did not change after further repeated crystallizations. The rotation $\alpha_D^{25}$ was $$-72.5 \pm 0.3°$$

Mixtures of α- and β-anomers showed melting point depressions of 15° to 20°.

*Analysis.*—$C_{25}H_{23}O_7N_2F$, calc'd: C, 62.3; H, 4.8; N, 5.8. Found: C, 62.61; H, 4.68; N, 5.54.

*Example 8.—α-2'-deoxy-5-fluorouridine*

[VII, Z=fluorine.]

12 g. of α-3',5'-di(p-toluoyl)-2'-deoxy-5-fluorouridine, M.P. 215°, $\alpha_D^{25} = -72.5° \pm 0.3°$, was suspended in 180 ml. of anhydrous methanol. A few drops of alcoholic phenolphthalein solution were added. The suspension was cooled to 0–10° and a 0.555 N barium methylate solution in methanol was added in portions, in the manner indicated in Example 6. In the present example, 10 ml. of the barium methylate solution were added initially and then, over a course of six hours, six portions of 5 ml. each. By this time, the suspended material had practically dissolved and the solution retained the pink color, indicating alkalinity, even upon standing. The solution was allowed to stand in the refrigerator for 18 hours longer. Then 1 N aqueous sulfuric acid was added from a burette in an amount (22.3 ml.) equivalent to the originally added barium methylate solution. The precipitated barium sulfate was colloidal and could not be filtered. The liquid was therefore evaporated in a vacuum, the residue was extracted twice with 50 ml. portions of boiling acetone, and the acetone extract was filtered by suction through a filter tightened with Celite. The filtrate was evaporated in a vacuum to a syrup. The syrup was washed repeatedly with absolute ether in order to remove methyl toluate. The residual syrup crystallized spontaneously after prolonged standing at room temperature, or immediately when seeded. The crystals were slurried with ether and collected by filtration. The melting point of 150–151° did not change after recrystallization from butyl acetate. The yield (5.5 g.) of α-2'-deoxy-5-fluorouridine corresponded to 90% of theory. The rotation $\alpha_D^{25}$ was −21°, 2% in water. The compound gives a strong melting point depression with β-2'-deoxy-5-fluorouridine.

*Analysis.*—$C_9H_{11}O_5N_2F$, calc'd: N, 11.4; F, 7.75. Found: N, 11.59, 11.67; F, 8.19, 8.11.

*Example 9.—3',5'-di(p-chlorobenzoyl)-2'-deoxy-5-fluorouridine*

[VI, Z=fluorine, R=p-chlorophenyl.]

6.6 g. of mono(5-fluorouracilyl)mercury was suspended in 300 ml. of toluene in a three-neck, round-bottom flask equipped with stirrer, moisture-trap and reflux condenser. The mixture was heated while stirring and 100 ml. of toluene was distilled off (by discharging the moisture-trap when it had filled). 16.2 g. of 3,5-di(p-chlorobenzoyl)-2-deoxy-D-ribofuranosyl chloride (V, R=p-chlorophenyl) was added. All of the material dissolved immediately. Heating was continued for 20 minutes and 50 ml. of toluene, accumulated in the moisture-trap, was taken off. The solution was allowed to cool and then was stirred with a solution of 20 g. of potassium iodide in 80 ml. of water, in order to remove mercuric chloride from the toluene layer. The toluene layer was separated and 200 ml. of heptane was added to it while stirring and cooling, causing precipitation of an amorphous but filterable mixture of α- and β-3',5'-di(p-chlorobenzoyl)-2'-deoxy-5-fluorouridine. This was collected by filtration.

The reactant 3,5-di(p-chlorobenzoyl)-2-deoxy-D-ribofuranosyl chloride, referred to above, can be made by the following procedure:

3.5 g. of dry crystalline 2-deoxy-D-ribose was dissolved in 63 ml. of methanol and 7 ml. of a 1% solution of anhydrous hydrogen chloride in methanol was added. The mixture was allowed to stand for 20 minutes at 27°. Five g. of silver carbonate was added and the mixture was stirred thoroughly. The silver salts were removed by filtration. The methanol was distilled off in a vacuum as completely as possible, the residue was diluted with 10 ml. of anhydrous pyridine, and the solution was again evaporated in a vacuum in order to remove the last traces of methanol.

The oily residue, crude 1-methyl-2-deoxy-D-ribofuranoside, was dissolved in 20 ml. of anhydrous pyridine and 8 ml. of p-chlorobenzoyl chloride was added in portions while cooling with ice water to maintain the temperature between 20° and 40°. The mixture was allowed to stand overnight, water and methylene chloride were added, the layers were separated, and the methylene chloride layer was washed successively with $KHSO_4$ solution and water, dried over sodium sulfate and finally evaporated in a vacuum.

The syrupy residue, 3,5-di(p-chlorobenzoyl)-1-methyl-2-deoxy-D-ribofuranoside, was dissolved in 20 ml. of acetic acid and 50 ml. of a cold saturated solution of anhydrous hydrogen chloride in 100 ml. acetic acid was added at 10–15°. Crystallization of 3,5-di(p-chlorobenzoyl)-deoxyribofuranosyl chloride occurred.

Example 10.—β-3′,5′-di(p-chlorobenzoyl)-2′-deoxy-5-fluorouridine

[VI, Z=fluorine, R=p-chlorophenyl.]

The entire amount of the mixture of α- and β-3′,5′-di (p-chlorobenzoyl)-2′-deoxy-5 - fluorouridine obtained in Example 9 was slurried with 50 ml. of ethanol at 50°. Upon standing, the β-anomer crystallized rapidly, whereas the α-anomer remained in solution. The mixture was allowed to cool and then the crystallized precipitate was filtered by suction. The solid was recrystallized once from 15 to 20 ml. of acetic acid, whereupon it had M.P. of 197–198°. The yield of 3–3.5 g. corresponded to 29–33% of theory.

Analysis.—$C_{23}H_{17}O_2N_2Cl_2F$, calc'd: C, 52.7; H, 3.25; N, 5.35; Cl, 13.55. Found: C, 52.97; H, 3.50; Cl, 13.73, 13.62.

Example 11.—β-2′-deoxy-5-fluorouridine

[VII, Z=fluorine.]

2 g. of β-3′,5′-di(p-chlorobenzoyl)-2′-deoxy-5-fluorouridine was suspended in 40 ml. of methanol and 5.5 ml. of 0.555 N methanolic barium methylate solution was added at 0–5° over a period of six hours. The material slowly went into solution. The mixture was allowed to stand at 0–5° for 12 hours and then was worked up as described in Example 6. 0.9 g. of pure β-2′-deoxy-5-fluorouridine was obtained, corresponding to a yield of 88%.

Example 12.—1-acetylthymine

[II, Z=methyl.]

12.6 g. of thymine was reacted with 50 ml. of acetic anhydride and 0.5 ml. of pyridine, in similar manner to that described in Example 1. Upon cooling, the product crystallized from the reaction mixture. Crystallization was completed by adding 100 ml. of a mixture of equal volumes of ether and petroleum ether. The yield of 1-acetylthymine obtained was 15.2 g., corresponding to 90.5% of theory. The melting point, 197°, did not change even after recrystallization from a large amount of ethyl acetate.

Analysis.—$C_7H_8N_2O_3$, calc'd: C, 50.0; H, 4.75; N, 16.7. Found: C, 51.00; H, 4.53; N, 16.37, 16.21.

Example 13.—Monothyminylmercury

[IV, Z=methyl.]

16.8 g. of 1-acetylthymine was added to a hot solution of 31.8 g. of mercuric acetate in one liter of methanol, while stirring, and the mixture was refluxed, while stirring, for one hour. It was allowed to cool while stirring overnight. The fine crystalline precipitate was filtered by suction and washed on the filter with methanol. After drying at 70°, monothyminylmercury was obtained as a white heavy powder, which did not melt below 300°. The yield, 32 g., was quantitative.

Analysis.—$C_5H_3O_2N_2Hg$, calc'd: N, 8.65. Found: N, 8.33, 8.48.

Example 14.—β-3′,5′-di(p-toluoyl)thymidine

[VI, Z=methyl, R=p-tolyl.]

64 g. of monothyminylmercury was suspended in 3 liters of toluene in a 5 liter, three-neck flask equipped with stirrer, moisture-trap, and reflux condenser. The mixture was heated while stirring and one liter of toluene was distilled off (by discharging the moisture-trap when it had filled). The suspension was then cooled to room temperature and 150 g. of 3,5-di(p-toluoyl)-2-deoxy-D-ribofuranosyl chloride was added. After stirring for 10 minutes, the mixture was gradually heated to the boiling point of toluene and refluxed for 20 minutes, with continued stirring. The mixture was allowed to cool, and then a solution of 200 g. of potassium iodide in 800 ml. of water was added. The mixture was stirred for several minutes in order to remove mercury from the toluene layer. The latter was then separated and evaporated in a vacuum to a syrup. The syrup was taken up in 400 ml. of ether and allowed to crystallize. The crystals of β-3′,5′-di(p-toluoyl)-thymidine were collected by filtration and showed a melting point of 187–190°. The yield of 48 g. corresponded to 50% of theory. Recrystallization from 200 ml. of acetic acid gave 46 g. of highly pure material having M.P. 197°.

Example 15.—α-3′,5′-di(p-toluoyl)thymidine

[VI, Z=methyl, R=p-tolyl.]

The ethereal mother liquor of the β-ditoluoylthymidine (Example 14) was evaporated in vacuo, the residue was diluted with 100 ml. of toluene, and crude amorphous α-3′,5′-di(p-toluoyl)-thymidine was precipitated by the addition of 200 ml. of heptane. The gum was dissolved in as little ether as possible and was allowed to crystallize. Crystallization of α-3′,5′-di(p-toluoyl)-thymidine without seeding occurred only after weeks, and then proceeded very slowly. Even when seeded, the solution had to stand for several days for completion of crystallization. After recrystallization from alcohol, α-3′,5′-di(p-toluoyl)thymidine melted at 138°. The yield amounted to 6.8 g.

Example 16.—β-Thymidine

[VII, Z=methyl.]

2.4 g. of β-3′,5′-di(p-toluoyl)thymidine was suspended in 50 ml. of methanol and 1 ml. of 0.5 N barium methylate in methanol was added. The mixture was allowed to stand at 0–5° for 24 hours, was occasional shaking. To the clear solution was added 1 ml. of 0.5 N sulfuric acid, the methanol was distilled off in a vacuum, and the residue was washed with ether to remove methyl toluate. When seeded, the material solidified completely to a crystalline cake of β-thymidine. To remove contaminating barium sulfate, it was dissolved in 20–30 ml. of hot alcohol, the solution was cleared by filtration through a filter aid (Celite) and the filtrate was evaporated in a vacuum. The crystalline residue showed a melting point of 185°, which gave no depression with an authentic sample of β-thymidine. The yield, 1 g., was substantially quantitative.

Example 17.—α-Thymidine

[VII, Z=methyl.]

Another preparation of the gummy heptane precipitate of α-3′, 5′-di(p-toluoyl)thymidine described in Example 15, and weighing approximately 20 g., was dissolved in 400 ml. of methanol, and 60 ml. of 0.79 N barium methylate in methanol was added. After allowing the mixture to stand at room temperature for four hours, the calculated amount of 1 N sulfuric acid was added. The mixture, without filtering, was then evaporated in a vacuum to a syrupy consistency, and methyl toluate was removed by washing the residue repeatedly with small amounts of ether. The residue was then taken up in 50 ml. of water and barium sulfate was removed by filtration through a suction funnel, tightened with Celite, charcoal and a thin layer of freshly precipitated barium sulfate. The filtrate was evaporated again to a syrup, and the residue was slurried with 20 ml. of a saturated ammonium sulfate solution. α-Thymidine soon crystallized. The solution was allowed to stand overnight, and then the crystals were collected by filtration. Recrystallization from alcohol furnished compact well-shaped prisms melting at 187°, and showing a melting point depression with β-thymidine (melting at 185° C.) of 10 to 15°. The yield was 2.5 g. $α_D^{25} = +7.2° \pm 0.1$, 2% in water.

Analysis.—$C_{10}H_{14}O_5N_2$, calc'd: C, 49.58; H, 5.82; N, 11.56. Found: C, 49.61; H, 5.60; N, 11.35.

Example 18.—α-Thymidine 2.4 g. of α-3′, 5′-di(p-toluoyl)thymidine of M.P. 138° was suspended in 50 ml. of methanol and saponified in a manner similar to that indicated in Example 17, but using 0.5 N barium methylate in methanol. The reaction mixture was worked up in a manner similar to Example 17. After removal of the barium as barium sulfate, and concentration of the filtrate, α-thymidine crystallized. It was identical with the product obtained in Example 17.

I claim:

1. A process of making 2'-deoxy-5-fluorouridine which comprises reacting 3,5-diaroyl-2-deoxy-D-ribofuranosyl halide with mono(5-fluorouracilyl)mercury, thereby forming 1-(3',5'-diaroyl-2'deoxy-D-ribofuranosyl)-5-fluorouracil, and hydrolyzing the latter.

2. 1 - (3',5'-diaroyl-2'-deoxy-D-ribonfuranosyl)-5-fluorouracil.

3. A process of making 1-(3',5'-diaroyl-2'-deoxy-D-ribofuranosyl)-5-fluorouracil which comprises reacting 3,5-diaroyl-2-deoxy-D-ribofuranosyl halide with mono-(5-fluorouracilyl)mercury.

4. A process of making 2'-deoxy-5-fluorouridine which comprises saponifying 1-(3',5'-diaroyl-2'-deoxy-D-ribofuranosyl)-5-fluorouracil.

5. 1-(3',5'-di[p-chlorobenzoyl]-2'-deoxy-D-ribofuranosyl)-5-fluorouracil.

6. 1 - (3',5'-di[p-toluoyl]-2'-deoxy-D-ribofuranosyl)-5-fluorouracil.

7. A process of making thymadine which comprises reacting 3,5-diaroyl-2-deoxy-D-ribofuranosyl halide with monothyminylmercury, thereby forming 1-(3',5'-diaroyl-2'-deoxy-D-ribofuranosyl)thymine, and hydrolyzing the latter.

8. A process of making 1-(3',5'-diaroyl-2'-deoxy-D-ribofuranosyl)thymine which comprises reacting 3,5-diaroyl-2-deoxy-D-ribofuranosyl halide with monothyminyl mercury.

9. 1 - (3',5' - di[p-toluoyl]-2'-deoxy-D-ribofuranosyl)-thymine.

References Cited in the file of this patent

UNITED STATES PATENTS

| | | |
|---|---|---|
| 2,085,858 | Jung et al. | July 6, 1937 |
| 2,118,133 | Anderson | May 24, 1938 |
| 2,795,580 | Khorana | June 11, 1957 |
| 2,802,005 | Heidelberger et al. | Aug. 6, 1957 |
| 2,885,396 | Heidelberger et al. | May 5, 1959 |